United States Patent
Herrmann

(10) Patent No.: US 10,788,594 B2
(45) Date of Patent: Sep. 29, 2020

(54) WINDOW-BASED SPECTRUM MEASUREMENT IN A SPECTRAL CT DETECTOR

(71) Applicant: KONINKLIJKE PHILIPS N.V., Eindhoven (NL)

(72) Inventor: Christoph Herrmann, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 15 days.

(21) Appl. No.: 15/502,788

(22) PCT Filed: Aug. 24, 2015

(86) PCT No.: PCT/IB2015/056381
§ 371 (c)(1),
(2) Date: Feb. 9, 2017

(87) PCT Pub. No.: WO2016/034976
PCT Pub. Date: Mar. 10, 2016

(65) Prior Publication Data
US 2017/0234996 A1  Aug. 17, 2017

Related U.S. Application Data

(60) Provisional application No. 62/044,550, filed on Sep. 2, 2014.

(51) Int. Cl.
*G01T 1/24* (2006.01)
*G01T 1/36* (2006.01)

(52) U.S. Cl.
CPC ............. *G01T 1/247* (2013.01); *G01T 1/36* (2013.01)

(58) Field of Classification Search
CPC .......... G01T 1/24; G01T 1/2928; H04N 5/32; G03B 42/04; H01L 27/14676
See application file for complete search history.

(56) References Cited

U.S. PATENT DOCUMENTS

| | | | | |
|---|---|---|---|---|
| 5,200,625 A | * | 4/1993 | Kawai | G01T 1/36 250/374 |
| 2005/0247879 A1 | * | 11/2005 | Xie | G01T 1/2985 250/363.03 |

(Continued)

FOREIGN PATENT DOCUMENTS

| | | |
|---|---|---|
| EP | 0483753 | 5/1992 |
| WO | 2006117720 | 11/2006 |

OTHER PUBLICATIONS

Alvarez et al., "Energy-selective reconstructions in x-ray computerized tomography," Phys. Med. Biol., 1976, 21: 733-44.

*Primary Examiner* — David P Porta
*Assistant Examiner* — Mamadou Faye
(74) *Attorney, Agent, or Firm* — Larry Liberchuk

(57) ABSTRACT

A discriminator (118) includes a set of comparators (120, $202_1$, $202_3$, ..., $202_N$), a window width generator (124, 214, $214_1$, ..., $214_N$), and a set of reference signal generators (122, $212_1$, $212_2$, $212_3$, ..., $212_N$). In response to the discriminator being in a window based spectrum measurement mode, a first reference signal generator for a first comparator generates a reference signal that is supplied to the first comparator and that is added with the window width with a result of the addition supplied to the second comparator. The first comparator compares a peak height of a pulse indicative of an energy of detected radiation with the supplied reference signal and produces a first output indicating which of the peak height or the reference signal is greater. The second comparator compares the peak height with the supplied result of the addition and produces a second output indicating which of the peak height or the result of the addition is greater.

16 Claims, 6 Drawing Sheets

(56) References Cited

U.S. PATENT DOCUMENTS

| | | | |
|---|---|---|---|
| 2010/0329425 A1 | 12/2010 | Guo | |
| 2011/0096905 A1* | 4/2011 | Roessl | A61B 5/4869 |
| | | | 378/62 |
| 2011/0121980 A1* | 5/2011 | Doughty | G01T 1/026 |
| | | | 340/600 |
| 2014/0185760 A1* | 7/2014 | Kim | A61B 6/4241 |
| | | | 378/62 |
| 2015/0168570 A1* | 6/2015 | Pelc | G01T 1/247 |
| | | | 378/5 |

* cited by examiner

WINDOW-BASED SPECTRUM MEASUREMENT IN A SPECTRAL CT DETECTOR

CROSS REFERENCE TO RELATED APPLICATIONS

This application is the U.S. National Phase application under 35 U.S.C. § 371 of International Application No. PCT/IB2015/056381, filed Aug. 24, 2015, published as WO2016/034976 on Mar. 10, 2016, which claims the benefit of U.S. Provisional Patent Application No. 62/044,550 filed Sep. 2, 2014. These applications are hereby incorporated by reference herein.

FIELD OF THE INVENTION

The following generally relates to a photon counting detector and is described with particular application to computed tomography (CT); however, the following is also amenable to other imaging modalities.

BACKGROUND OF THE INVENTION

A computed tomography (CT) scanner generally includes a rotating gantry rotatably mounted to a stationary gantry. The rotating gantry supports an X-ray tube and is configured to rotate around an examination region about a longitudinal or Z-axis. A detector array is located opposite the X-ray tube, across the examination region. The X-ray tube is configured to emit radiation that traverses the examination region (and a portion of an object or a subject therein) and impinges upon the detector array. The detector array includes a one or two dimensional array of detector pixels that detect the radiation and produce signals indicative thereof. Each pixel conveys a corresponding signal for further processing. A reconstructor reconstructs the signals, producing volumetric image.

For spectral CT, the detector pixels can include a direct conversion material disposed between a cathode and an anode with a voltage applied across the cathode and anode. Photons strike the cathode, transferring energy to electrons in the direct conversion material, which creates electron/hole pairs, with the electrons drifting towards the anode. The anode produces the electrical signals output by the detector array. A pulse shaper processes the signals and produces pulses having peak heights indicative of the energy of the detected radiation. A discriminator compares, with comparators, the heights with a set of energy thresholds. For each threshold, a counter counts a number of times a pulse height crosses the threshold. A binner bins the counts in energy-ranges. A decomposer decomposes the binned data, e.g., into spectral components. The reconstructor reconstructs the spectral components.

The forward-model-based evaluation technique of measured photon-counting data, e.g., using the Alvarez-Macovsky decomposition, requires an accurate estimate of the detector pixels' detector response, i.e., for different single excitation energies, the spectrum of absorbed energies. Using a photon-counting readout channel for a detector pixel, the detector response can be obtained by differentiating a threshold scan obtained with one of the available comparators. Unfortunately, such a measurement is highly noisy since the differentiation amplifies the inherent noise within the threshold scan data. For example, discrete differentiation implies subtraction of two statistically independent noisy Poisson random variables, so that the resulting variance equals the sum of the individual variances.

By using two different comparators, a window based spectrum measurement can be implemented. By measuring the (Poisson distributed) counts within the energy window defined by the two comparators, the resulting noise is considerably reduced, at least because the number of counts within the window is much smaller than the number of counts above one of the thresholds. However, gain mismatches between the two comparators results in window widths that vary, or will not be constant, across the range of all threshold levels. As a consequence, the measurements require significant correction, resulting in a complex measurement procedure.

Aspects described herein addresses the above-referenced problems and others.

SUMMARY OF THE INVENTION

In one aspect, a detector array signal processor of an imaging system includes a discriminator. The discriminator includes a set of comparators, a window width generator that generates a window width for a window based spectrum measurement, and a set of reference signal generators, each corresponding to a different one of the comparators, which generate different reference signals. In response to the discriminator being in a window based spectrum measurement mode, a first reference signal generator for a first comparator generates a reference signal that is supplied to the first comparator and that is added with the window width with a result of the addition supplied to the second comparator. The first comparator compares a peak height of a pulse indicative of an energy of detected radiation with the supplied reference signal and produces a first output indicating which of the peak height or the reference signal is greater. The second comparator compares the peak height with the supplied result of the addition and produces a second output indicating which of the peak height or the result of the addition is greater.

In another aspect, a method includes receiving, sequentially, a plurality of pulses, each having a peak height indicative of an energy of different detected radiation, a window width for a window based spectrum measurement, and a set of reference signals for a first comparator. The method further includes providing the pulse and, sequentially, each of the reference signals of the set to the first comparator and the pulse and, sequentially, each of the reference signals added to the window width to a second comparator. The method further includes counting a first number of times a first output of the first comparator exceeds the reference signals and a second number of times a second output of the second comparator exceeds the reference signals added to the window width. The method further includes determining a window based spectrum measurement for each of the different reference signals by determining a difference between the first number and the second number for the corresponding reference signals.

In another aspect, a method includes receiving, sequentially, a plurality of pulses, each having a peak height indicative of an energy of different detected radiation, a window width for a window based spectrum measurement, and a set of reference signals for a first comparator. The method further includes providing the pulse and, sequentially, each of the reference signals of the set to the first comparator, and the pulse and, sequentially, each of the reference signals added to the window width to a second comparator. The method further includes counting a first number of times a first output of the first comparator exceeds the reference signals and counting a second number of times a second output of the second comparator exceeds the reference signals added to the window width. The method further includes calibrating an energy threshold of at least one of the first or the second comparators based on the window based spectrum measurements.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF EMBODIMENTS

Figure 1:
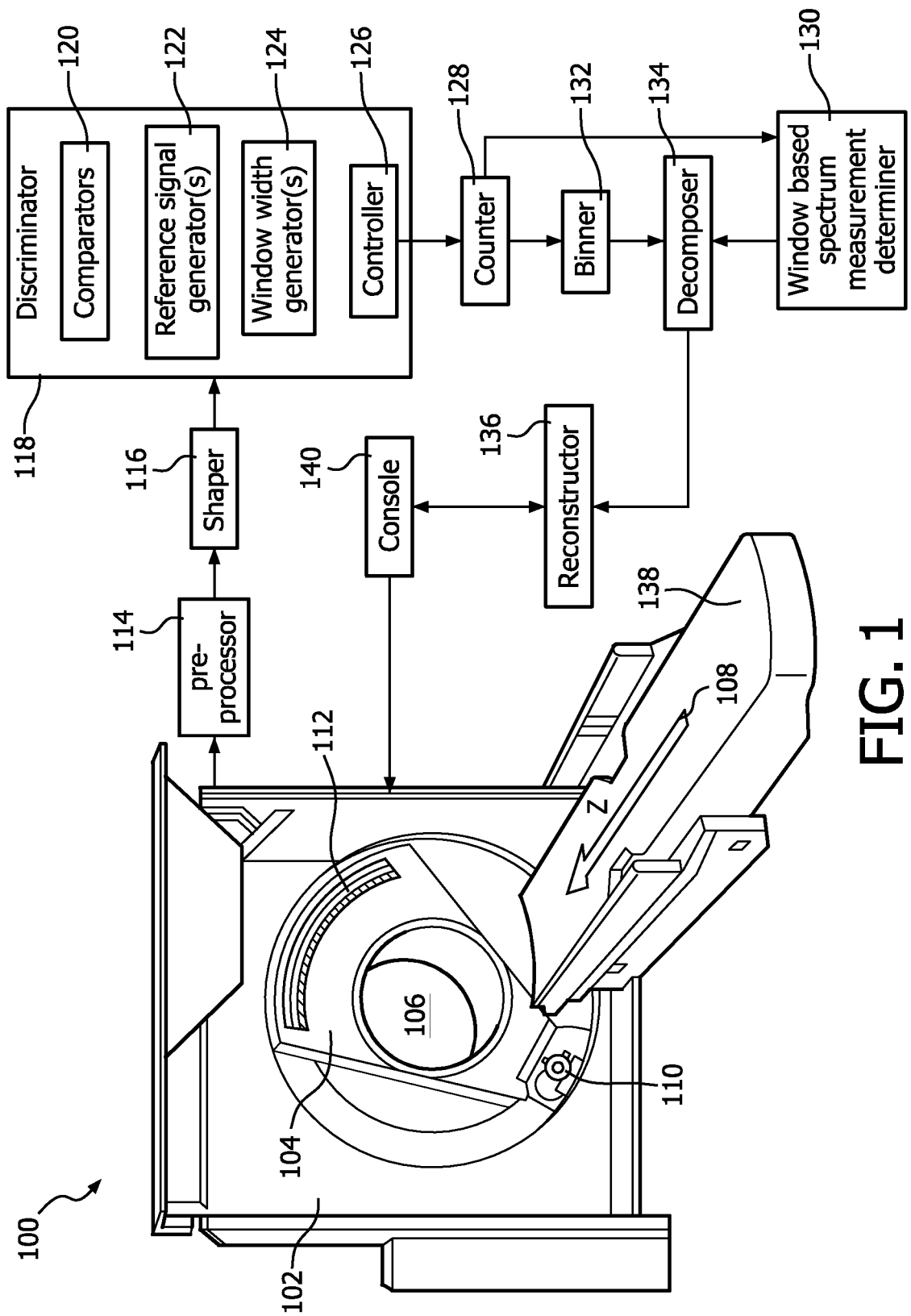
FIG. 1 schematically illustrates an example imaging system with a discriminator configured to operate in a window based spectrum measurement mode.

Initially referring to FIG. 1, an imaging system 100 such as a computed tomography (CT) scanner is schematically illustrated.

The imaging system 100 includes a stationary gantry 102 and a rotating gantry 104, which is rotatably supported by the stationary gantry 102. The rotating gantry 104 rotates around an examination region 106 about a longitudinal or z-axis 108.

A radiation source 110, such as an X-ray tube, is supported by and rotates with the rotating gantry 104 around the examination region 106 about the longitudinal or z-axis 108. The radiation source 110 emits ionizing (x-ray) radiation that traverses the examination region 106 and a portion of a subject or an object located therein.

A detector array 112 subtends an angular arc opposite the examination region 106 relative to the radiation source 110. The detector array 112 includes a one or two dimensional array of photon counting pixels, which include a direct conversion material such as cadmium telluride (CdTe), cadmium zinc telluride (CZT), silicon (Si), gallium arsenide (GaAs), and/or other direct conversion material. The detector array 112 detects radiation traversing the examination region 106 and generates an electrical signal indicative of the energy thereof.

A pre-processor 114 processes the signal. In one instance, the processing includes amplifying the electrical signal. In a variation, the pre-processor 114 is omitted. A pulse shaper 116 receives the amplified (or non-amplified) electrical signal and generates a pulse (e.g., voltage, current, etc.) having a peak height or peak amplitude that is indicative of the energy of the detected radiation.

A discriminator 118 includes a plurality of comparators 120, corresponding reference signal generators 122, one or more window width generators 124, and a controller 126.

The comparators 120 energy-discriminate the pulse, based on the peak height of the pulse and respective reference signals (energy levels) generated by the corresponding reference signal generators 122. The illustrated discriminator 118 is configured to operate in at least a window based spectrum measurement mode. In this mode, a threshold scan is performed in which a measurement is taken for an energy window between two different comparators 120, for each of a plurality of different reference signal levels, as the reference signal levels are swept through. As described in greater detail below, the controller 126 controls the discriminator 118 such that, for a window-based spectrum measurement for a particular threshold level, a single one of the reference signal generators 122 generates a single reference signal that is used by at least two of the comparators 120, and a window width generator 124 determines the window width there between.

A counter 128 counts, for each energy range, a number of pulses that falls within the energy range.

A window based spectrum measurement determiner 130, when the discriminator 118 is in the window based spectrum measurement mode, determines a window based spectrum measurement. As described in greater detail below, in one instance the measurement is determined by a difference in the count values of the two comparators 120. By using a single reference signal generator 122 and a window width generator 124, instead of two different reference signal generators 122 for the two comparators 120, performance differences offset and gain mismatches between reference signal generators 122 are mitigated, and the window width is well-defined. As a consequence, the window based spectral measurements are well-suited for energy component decompositions that employ an estimate of the detector pixel's response. Furthermore, the spectral measurements are well-suited for calibrating the threshold energy levels of each of the comparators 120. For a calibration, the energy threshold level for each of the comparators 120 is checked and tuned based on measurements for the different pairs of the comparators 120.

A binner 132 energy-bins or assigns the counts and hence the detected radiation to an energy window, thereby energy-resolving the detected radiation.

A decomposer 134 decomposes the energy-resolved detected radiation. For example, the decomposer 134 may decompose the energy-resolved detected radiation into a photoelectric component, a Compton scatter component, and/or other component. An example of a suitable decomposition approach is described in Alvarez et al., "Energy-selective reconstructions in x-ray computerized tomography," Phys. Med. Biol., 1976, 21: 733-44. The window based spectrum measurements and/or other information indicative of the response of the detector array 112 can be used with this approach. Other approaches are also contemplated herein.

It is to be appreciated that the decomposer 134 can be implemented with a computer processor(s) (e.g., a microprocessor, a central processing unit, etc.) executing a computer readable instruction(s) encoded or embedded on computer readable storage medium (which excludes transitory medium) such as physical memory. Additionally or alternatively, at least one of the computer readable instruction(s) is carried by a carrier wave, a signal, or other non-computer readable storage medium transitory medium.

It is to be appreciated that in some embodiments the pre-processor 114, the shaper 116, the discriminator 118, the counter 128, the binner 132, the window based spectrum measurement determiner 130, and the decomposer 134 are considered a detector array signal processor.

A reconstructor 136 reconstructs one or more of the decomposed components, producing spectral volumetric image data. Alternatively, the decomposed components are combined and reconstructed to produce non-spectral volumetric image data. A subject support 138, such as a couch, supports an object or subject in the examination region 106. This includes positioning the object or subject before, during and/or after a scan of the subject or object.

A computing system serves as an operator console 140, and includes an output device such as a display and an input device such as a keyboard, mouse, and/or the like. Software resident on the console 140 allows the operator to interact with the system 100. This may include selecting an imaging protocol, initiating scanning, invoking a comparator calibration routine, etc.

Figure 2:
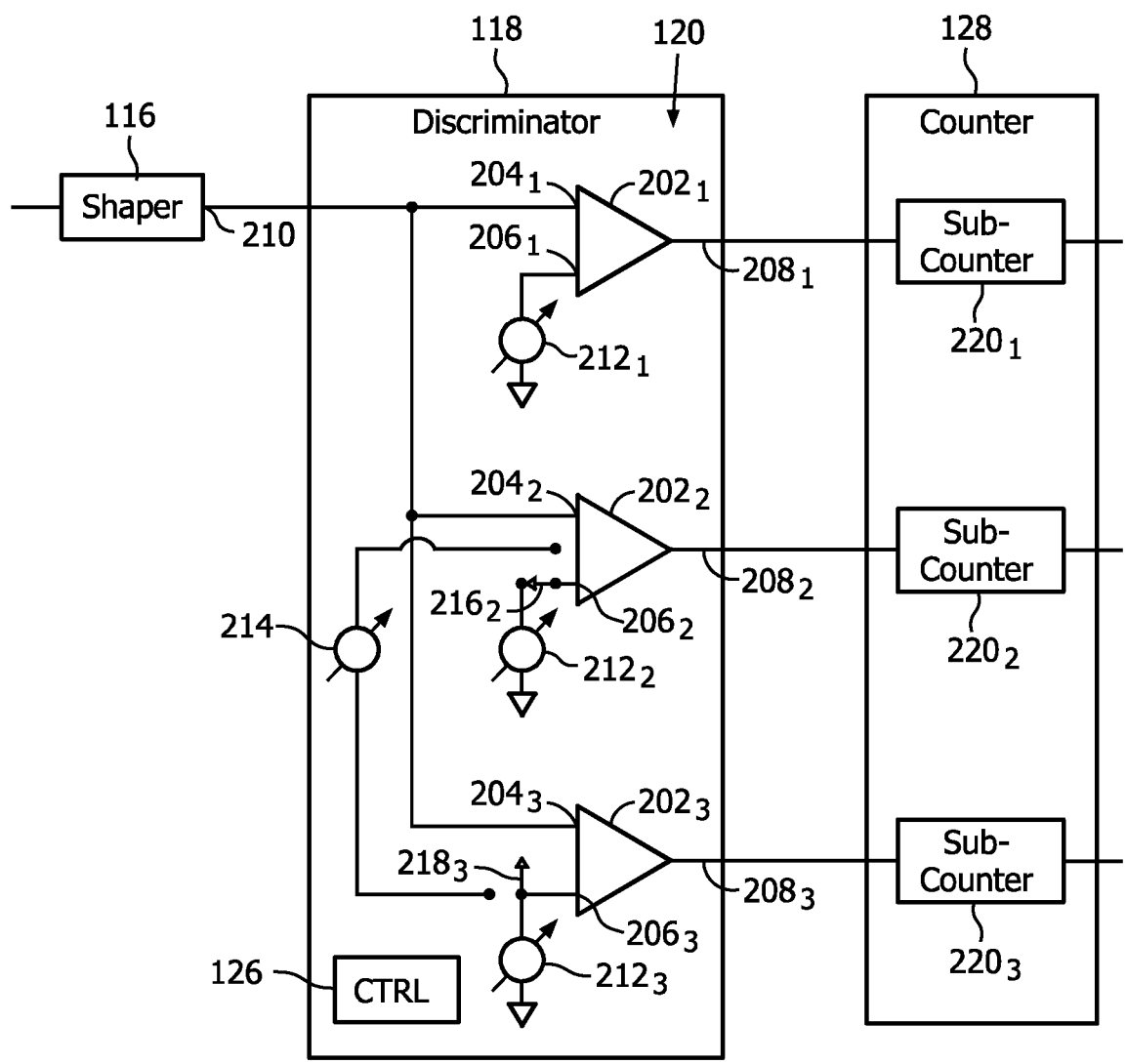
FIG. 2 schematically illustrates an example of the discriminator in a non-window based spectrum measurement mode.
Figure 3:
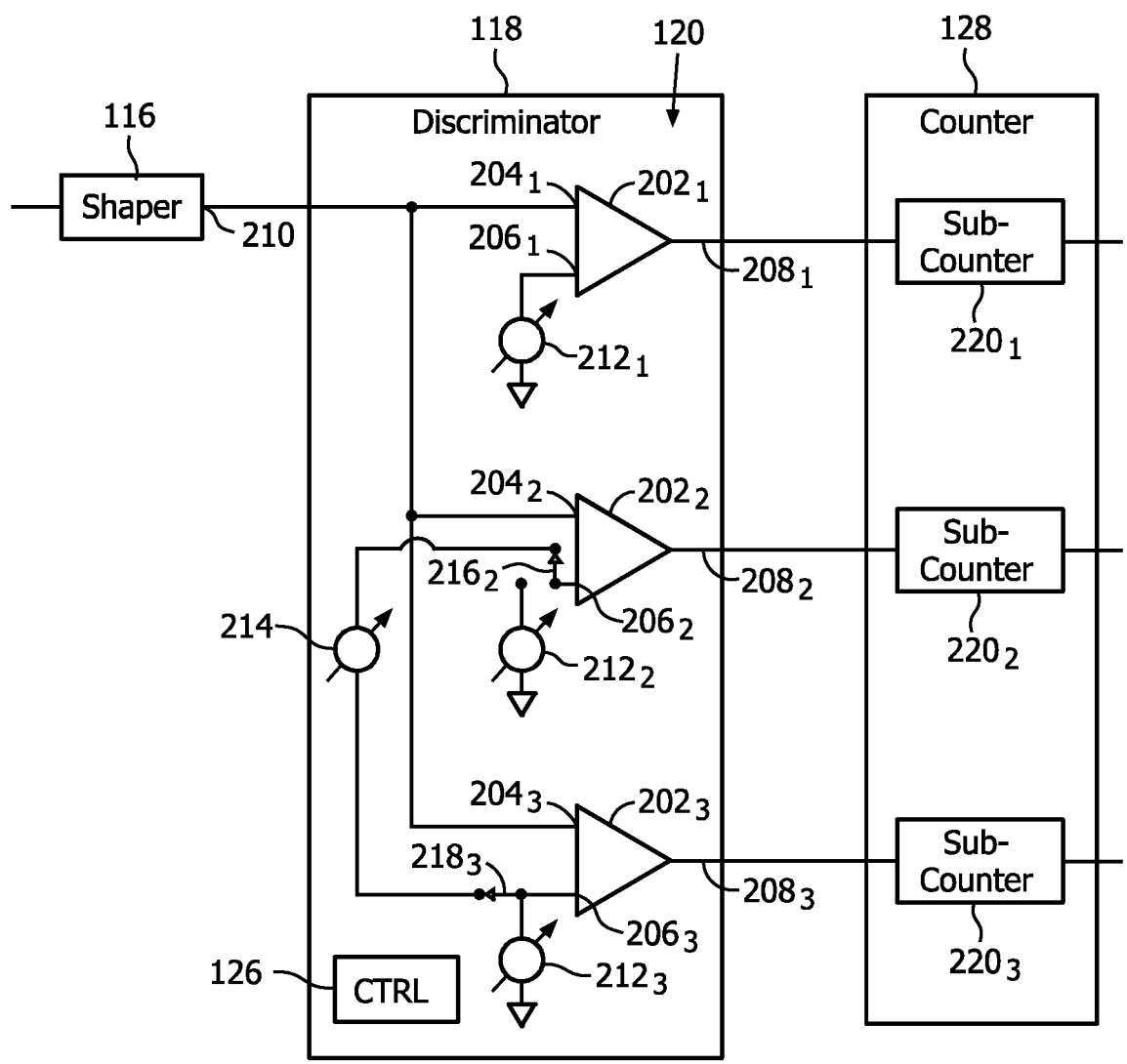
FIG. 3 schematically illustrates an example of the discriminator in the window based spectrum measurement mode.

FIGS. 2 and 3 schematically illustrate a non-limiting example of the discriminator 118 in connection with the shaper 116 and the counter 128.

Figure 5:
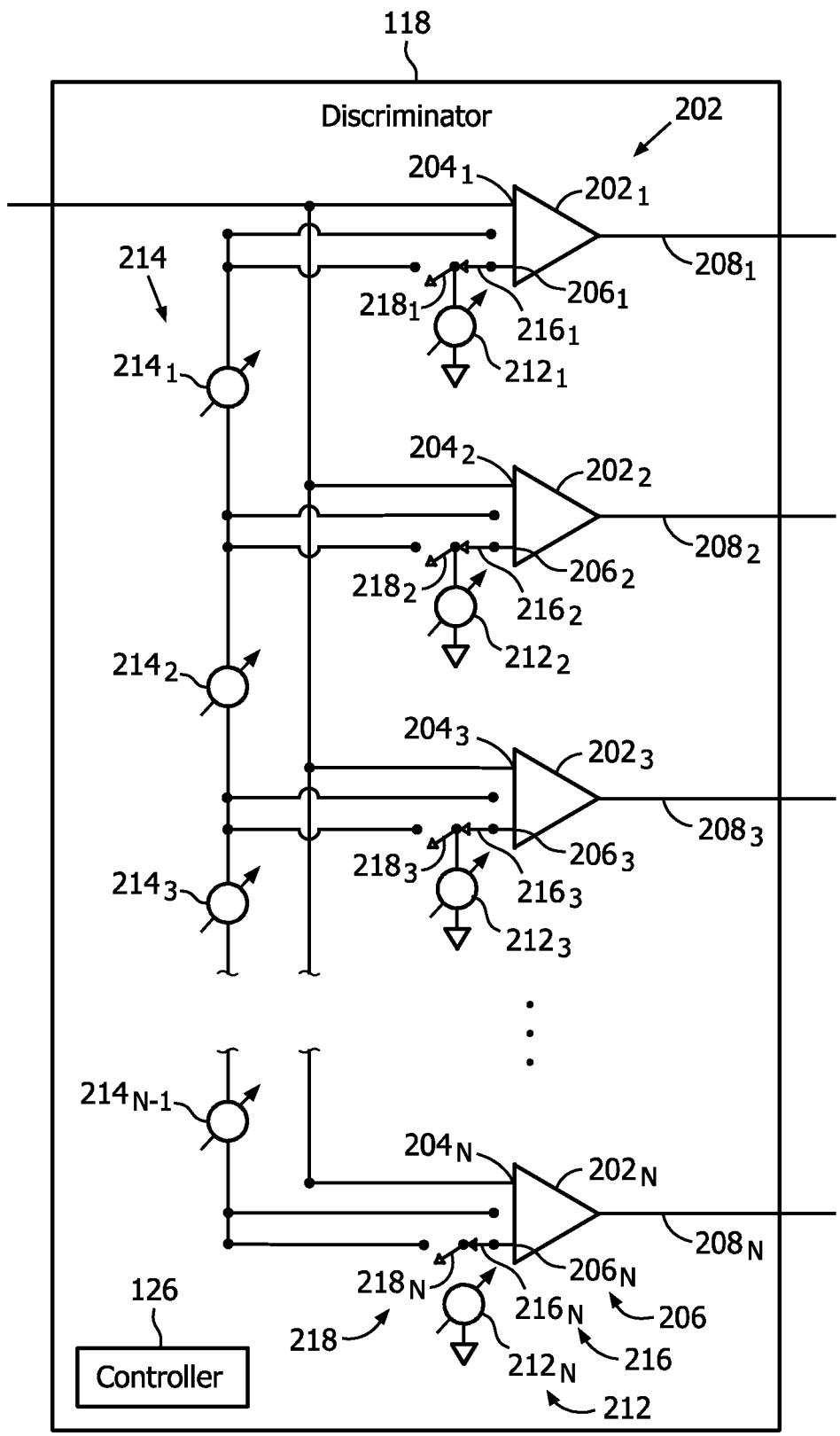
FIG. 5 schematically illustrates an example of the discriminator with N comparators.

For sake of brevity and clarity, this example is discussed in connection with three comparators 120. Such energy levels, in one instance, include energy levels corresponding to at least two different energy levels (e.g., low and high) such as the photoelectric effect and Compton scatter, the noise floor, etc. However, it is to be understood that in other embodiments, other energy levels, including more than three energy levels are contemplated herein. For example, FIG. 5 illustrates a variation with N comparators 120 for N different energy levels.

The N comparators 120 includes a plurality of comparators $202_1$, $202_2$ and $202_3$, each including a first input terminal $204_1$, $204_2$ and $204_3$, a second input terminal $206_1$, $206_2$ and $206_3$, and an output terminal $208_1$, $208_2$ and $208_3$. The reference signal generators 122 include a plurality reference signal generators $212_1$, $212_2$ and $212_3$. The first input terminals $204_1$, $204_2$ and $204_3$ are each in electrical communication with an output terminal 210 of the shaper 116. The second input terminals $206_1$, $206_2$ and $206_3$ are each in electrical communication with the respective reference signal generators $212_1$, $212_2$ and $212_3$.

Each of the reference signal generators $212_1$, $212_2$ and $212_3$ can generate, alternatively, one of a plurality of different reference signals, independent of the other reference signal generators $212_1$, $212_2$ and $212_3$. The reference signals, similar to the pulse generated by the pulse shaper 116, are electrical signals such as voltages, currents, etc. In one instance, the reference signal generators $212_1$, $212_2$ and $212_3$ include digital-to-analog converters (DACs) that produce voltages in the millivolt range, which correspond to particular kV levels. A kV level can be incremented and/or decremented in steps of a tenth of a kV (e.g., 0.5 kV, 1.0 kV, etc.) or larger through corresponding millivolt setting.

The comparators $202_1$, $202_2$ and $202_3$ respectively compare the peak height of the pulse from the shaper 116 with a corresponding reference signal generated by the reference signal generators $212_1$, $212_2$ and $212_3$ and output signals indicating which of the two signals (i.e., the pulse or the reference signal) has a larger amplitude. Each of the reference signals corresponds to a different known energy level or threshold. By way of non-limiting example, the reference signal from the reference signal generator $212_2$ may correspond to 80 kV whereas the reference signal generator $212_3$ may correspond to 120 kV. Other kV values are also contemplated herein.

The window width generator 124 includes a window width generator 214, which can generate a predetermined window width for a particular spectrum measurement and can maintain or vary the width between measurements. The window widths, similar to the pulse generated by the pulse shaper 116, are electrical signals such as voltages, currents, etc. Similar to the reference signal generator $212_1$, $212_2$ and $212_3$, the window width generator 214 may include a DAC that produce voltages in the millivolt range. However, in this instance, the voltages correspond to a particular kV step. A step can be as small as a tenth of a kV (e.g., 0.5 kV, 1.0 kV, etc.).

A first switch $216_2$ resides between the second input terminal $206_2$, and the reference signal generator $212_2$. The first switch $216_2$ is configured to switch the second input terminal $206_2$ between the reference signal generator $212_2$ and the window width generator 214. A second switch $218_3$ resides between the second input terminal $206_3$ and the window reference signal width generator 214. The second switch $218_3$ is configured to open and close an electrical connection between the second input terminal $206_3$ and the window width generator 214.

The controller 126 controls the reference signal generators $212_1$, $212_2$ and $212_3$, the window width generator 214, and the switches $216_2$ and $218_3$. Such control may include controlling the reference signal generators $212_1$, $212_2$ and $212_3$ to generate particular threshold energy levels for the comparators $202_1$, $202_2$ and $202_3$, cycle through a set of predetermined reference signals for one or more of the comparators $202_1$, $202_2$ and $202_3$, for a threshold scan, generate a particular window width, change the window width, switch in and out of the window-based spectrum measurement mode, etc.

The counter 128 includes a plurality of sub-counters $220_1$, $220_2$ and $220_3$. The plurality of sub-counters $220_1$, $220_2$ and $218_3$ respectively are in electrical communication with the output terminals $208_1$, $208_2$ and $208_3$ of the comparators $202_1$, $202_2$ and $202_3$. Each of the plurality of sub-counters $220_1$, $220_2$ and $220_3$ increments a count value each time a peak height of a pulse is greater than the corresponding reference signal, based on the output of the comparators $202_1$, $202_2$ and $202_3$, which indicates whether the peak height of the pulse is greater than the corresponding reference signal.

With the switches $216_2$ and $218_3$ in the position shown in FIG. 2 (in which the switch $216_2$ electrically connects the second input $206_2$ and to the reference signal generator $212_2$ and disconnects the second input $206_2$ from the widow width generator 214, and the switch $218_3$ electrically disconnects the second input $206_3$ from the widow width generator 214), the discriminator 118 operates in a non-window-based spectrum measurement mode.

FIG. 3 shows the example of the discriminator 118 in the window-based spectrum measurement mode. For this, the switch $216_2$ electrically connects the second input $206_2$ and the window width generator 214 and disconnects the second input $206_2$ from the reference signal generator $212_2$, and the switch $218_3$ electrically connects the second input $206_3$ and the reference signal generator $212_3$ to the widow width generator 214.

Where the window width generator 214 generates a window of width "w1" and the reference signal generator $212_3$ generates a reference signal with a level "n1", the reference signal applied to the comparator $202_3$ is "n1" and the reference signal applied to the comparator $202_2$ is "n1+w1". The reference signal level can be simultaneously changed for both of the comparators $202_2$ and $202_3$ by controlling the reference signal applied to the comparator $202_3$. Where the reference signal is changed from "n1" to "n2" (e.g., "n2">"n1" or "n2"<"n1"), the reference signal applied to the comparator $202_2$ is "n2+w1".

Since the same reference signal generator signal generator $212_3$ generates the reference signal for both the comparators $202_2$ and $202_3$, the reference signal for both the comparators $202_2$ and $202_3$ is subject to a same reference signal generator gain and offset. Furthermore, the window width "w" will not vary due to differences in different reference signal generator gains between two different reference signal generators. Where the window width is change from "w1" to "w2" (e.g., "w2">"w1" or "w2"<"w1"), the reference signal applied to the comparator $202_2$ is "n1+w2".

For each reference signal applied during the threshold scan, the sub-counter $220_2$ and the sub-counter $220_3$ accumulates respective count values. The window based spectrum measurement determiner 130 determines a number of counts within the window width by calculating a difference value between the accumulated count values of the sub-counter $220_2$ and the sub-counter $220_3$ (e.g., count value of the sub-counter $220_2$ less the count value of the sub-counter $220_3$). The count values represent correlated measurement values since they are taken in a same measurement period.

Again, the example of FIG. 3 is not limiting. That is, in another embodiment, there may be more than three comparators 120. Furthermore, a different pair of the comparators 120 can be used for a window based spectrum measurement. Furthermore, more than a single pair of the comparators 120 can be used for window based spectrum measurements. For a different pair and/or additional comparators 120, the comparators 120 can be electrically connected and utilized as shown in FIGS. 2 and 3.

Figure 4:
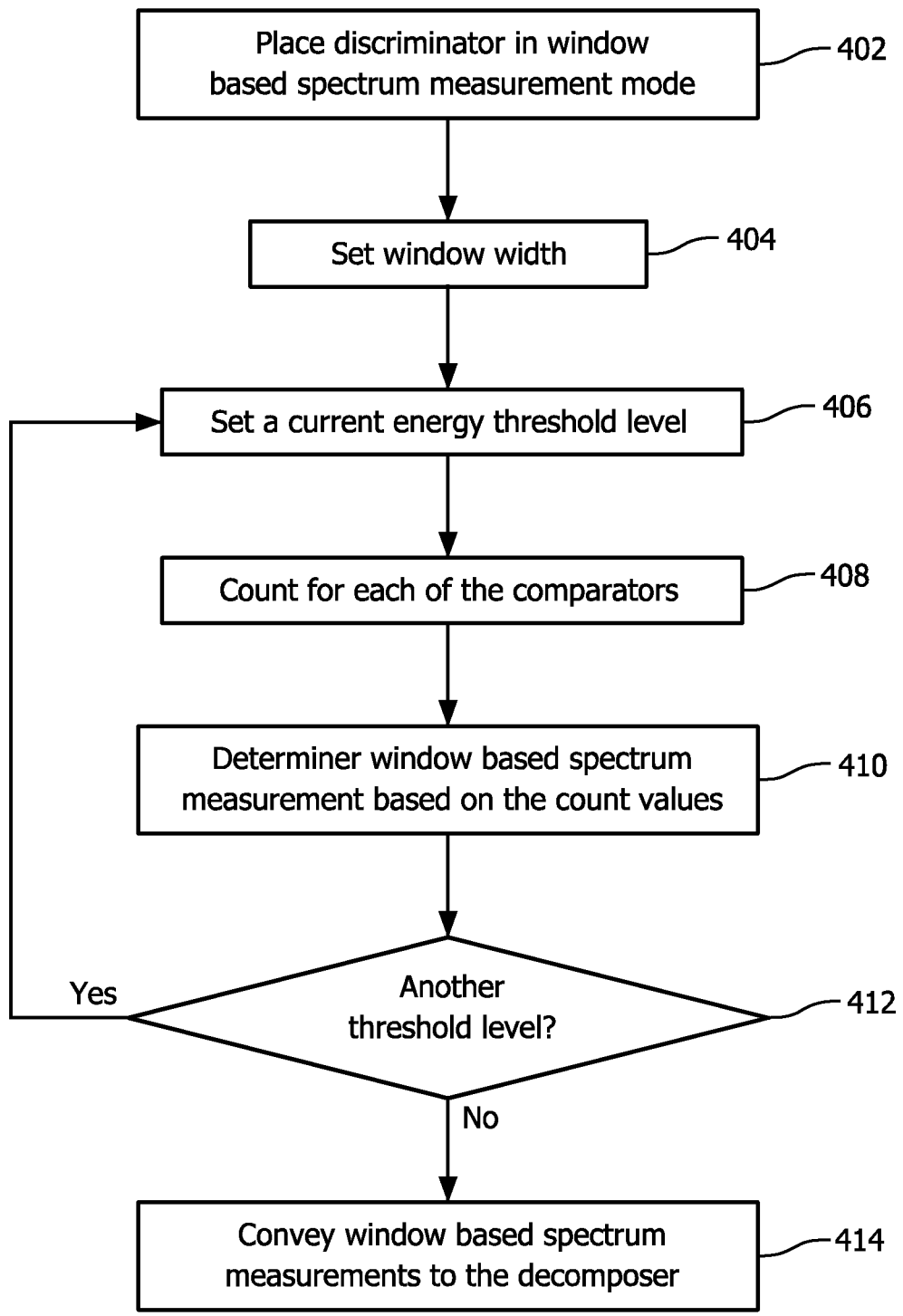
FIG. 4 illustrates an example method for taking window based spectrum measurements.

FIG. 4 illustrates a method for acquiring a window-based spectrum measurement for a decomposition of acquired data.

It is to be appreciated that the ordering of the acts in the methods described herein is not limiting. As such, other orderings are contemplated herein. In addition, one or more acts may be omitted and/or one or more additional acts may be included.

At 402, the window based spectrum measurement mode is activated.

At 404, a predetermined window width is set, as described herein.

At 406, a current reference energy threshold level is set for two comparators 120 using the same reference signal generator 122, as described herein.

At 408, the counter 128 counts for each of the two comparators 120, as described herein.

At 410, a window based spectrum measurement is determined by determining a difference in the count value for each of the comparators 120

At 412, it is determined whether there is a next reference signal level.

In response to there being another reference signal level, acts 406-410 are repeated with the current threshold level set to the next threshold level.

In response to there not being another reference signal level, at 414, the window-based spectrum measurements are conveyed to the decomposer 134, which decomposes the binned counts, using the window-based spectrum measurements as an estimate for the response of the detector.

The above may be implemented, at least in part, via one or more processors executing one or more computer readable instructions encoded or embodied on computer readable storage medium such as physical memory which causes the one or more processors to carry out the various acts and/or other functions and/or acts. Additionally or alternatively, the one or more processors can execute instructions carried by transitory medium such as a signal or carrier wave.

In a variation, the reference signal level of a reference signal generator 122 is maintained and the window width generator 124 varies the window width. This allows for characterizing the window width.

FIG. 5 shows an example in which the N comparators 120 includes comparators $202_1$, $202_2$, $202_3$, . . . , $202_N$ (where N is a positive integer). The comparators $202_1$, $202_2$, $202_3$, . . . , $202_N$ respectively have N first inputs 204, including first inputs $204_1$, $204_2$, $204_3$, . . . , $204_N$, N second inputs 206, including second inputs $206_1$, $206_2$, $206_3$, . . . , $206_N$, and N outputs 208, including outputs $208_1$, $208_2$, $208_3$, . . . , $208_N$. The window width generators 124 include window width generators 214, including window width generators $214_1$, $214_2$, $214_3$, . . . , $214_N$.

The reference signal generators 122 include N reference signal generators 212, including reference signal generators $212_1$, $212_2$, $212_3$, . . . , $212_N$. First switches 216, including first switches $216_1$, $216_2$, $216_3$, . . . , $216_N$ connect the N second inputs $206_1$, $206_2$, $206_3$, . . . , $206_N$ to either the reference signal generators $212_1$, $212_2$, $212_3$, . . . , $212_N$ or the window width generators $214_1$, $214_2$, $214_3$, . . . , $214_{N-1}$. Seconds switches, including second switches $218_1$, $218_2$, $218_3$, . . . , $218_N$ are between the window width generators $214_1$, $214_2$, $214_3$, . . . , $214_{N-1}$ and the N reference signal generators $212_1$, $212_2$, $212_3$, . . . , $212_N$.

In FIG. 5, for sake of clarity, a single window width generator 214 is shown located between each of the comparators 202, and the window width generators 214 are in series. With the configuration, a window based spectrum measurement for comparators $202_1$ and $202_3$ can use the window width generator $214_1$, $214_2$, or both $214_1$ and $214_2$ to set the window width.

In a variation of FIG. 5, a single and different window width generator 124 is utilized for each pair of comparators 120. In either instance, window based spectrum measurements can be used by the decomposer 134 and/or to calibrate the threshold level of each of the reference signals generators 122 for each of the comparators 120.

In another variation of FIG. 5, at least one of the comparators 120 is not configured for a window based spectrum measurements, similar to the comparator $202_1$ of FIG. 3.

In another embodiment, all N threshold channels are calibrated in a single measurement (rather than sequential measurements). For example, in one instance, for each of the N thresholds, two of the comparators 120, with logic, are used with N of the window width generators 124. The reference signal for a first of the two comparators 120 is provided by one of the reference generators 122, while the reference signal for a second of the two comparators 120 is a summation of this reference signal and a window width provided by the N window width generators 124.

With logic, an event is counted only if the first of the two comparators 120 trips and the second of the comparator 120 does not trip. With this configuration, only the counts within the window defined by the window width generator 124 are recorded. In addition, a switching network can be used to allow for window-based spectrum measurement for calibration purposes (involving the two comparators and the logic) or normal operation (involving only the first of the two comparators without the logic, i.e. a count is recorded as soon as the first of the two comparators trips).

In order to get comparable spectra for all N channels, the window widths provided by the N window width generators 124 are similar to each other. This may be achieved once by characterizing the window width as a function of the DAC values controlling the window width and storing those DAC values which lead to very similar window-widths values. In order get sufficiently similar window widths, the DAC is implemented with a larger number of bits (e.g. 6 bit), so that the least significant bit (LSB) corresponds to, e.g., 1/64 of the intended window width (a 0 width can be excluded).

Figure 6:
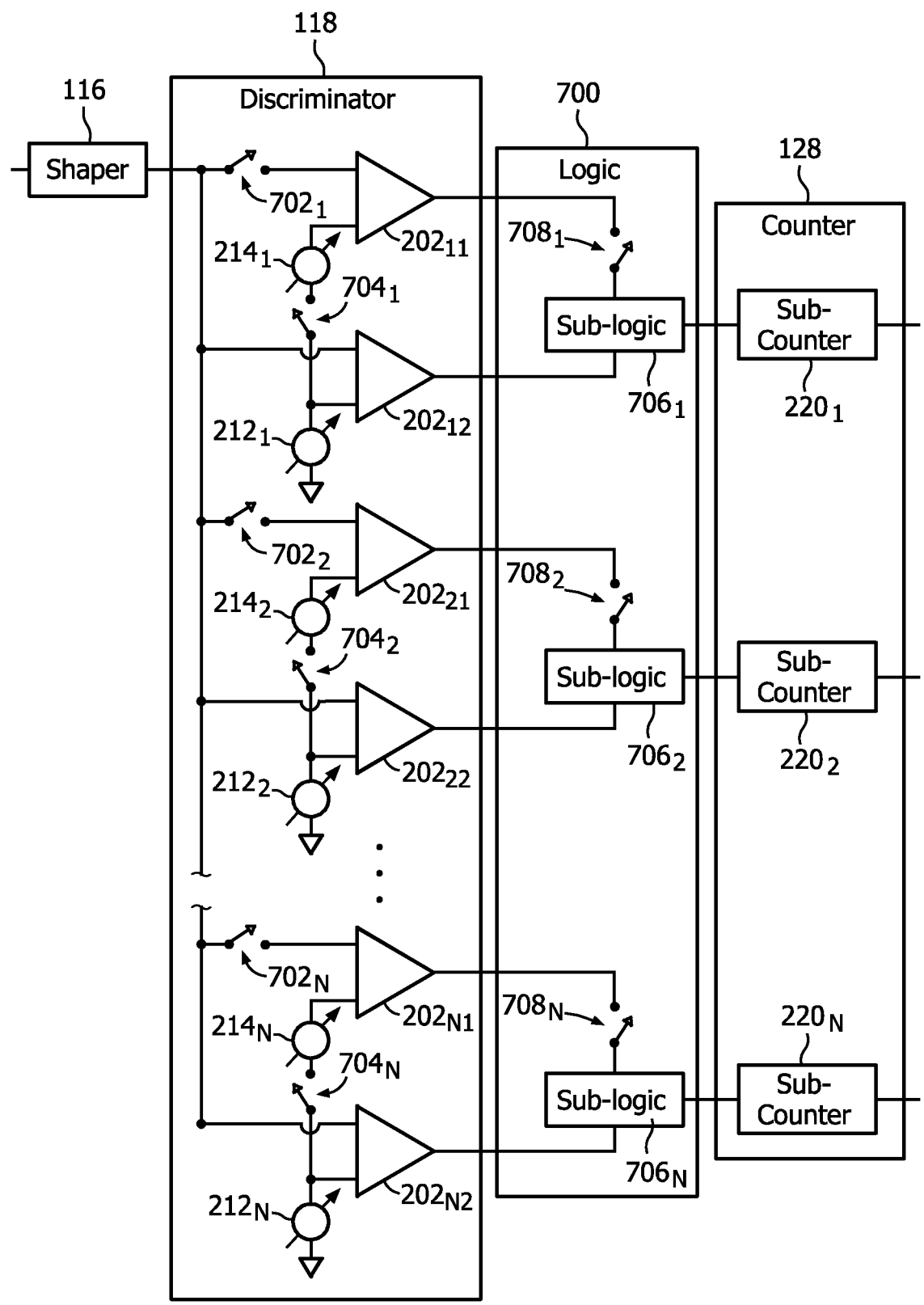
FIG. 6 shows an embodiment in which multiple threshold channels are calibrated in a single measurement.

FIG. 6 shows an embodiment in which multiple (e.g., at least two, all, etc.) threshold channels are calibrated in a single measurement, rather than sequential measurements. In this example of the comparators 202 is replaced with two comparators. For instance, $202_1$ is replaced with $202_{11}$ and $202_{12}$, $202_2$ is replaced with $202_{21}$ and $202_{22}$, ..., $202_N$ is replaced with $202_{N1}$ and $202_{N2}$. A first set of input channels of the comparators $202_{12}$ and $202_{22}$, ..., $202_{N2}$ is electrically connected directly to the output of the shaper 116. A first set of switches $702_1$, $702_2$, ..., $702_N$ respectively electrically connect and disconnects the output of the shaper 116 with a set of first input channels of the comparators $202_{11}$ and $202_{21}$, ..., $202_{N1}$.

A second set of input channels of the comparators $202_{12}$ and $202_{22}$, ..., $202_{N2}$ is respectively electrically connected to the reference signal generators $212_1$, $212_2$, ..., $212_N$. A second set of input channels of the comparators $202_{11}$ and $202_{21}$, ..., $202_{N1}$ is respectively electrically connected to the window width generators $214_1$, $214_2$, ..., $214_N$. A second set of switches $704_1$, $704_2$, ..., $704_N$ respectively electrically connect and disconnects the window width generators $214_1$, $214_2$, ..., $214_N$ with the reference signal generators $212_1$, $212_2$, ..., $212_N$. Logic 700 includes a set of sub-logic $706_1$, $706_2$, ..., $706_N$. A third set of switches $708_1$, $708_2$, ..., $708_N$ electrically connects and disconnects the outputs of the comparators $202_{11}$ and $202_{21}$, ..., $202_{N1}$ with the sub-logic $706_1$, $706_2$, ..., $706_N$. The outputs of the comparators $202_{12}$ and $202_{22}$, ..., $202_{N2}$ are electrically connected to the sub-logic $706_1$, $706_2$, ..., $706_N$.

For calibration, the first set of switches $702_1$, $702_2$, ..., $702_N$ is closed and electrically connects the output of the shaper 116 and the comparators $202_{11}$ and $202_{21}$, ..., $202_{N1}$. The second set of switches $704_1$, $704_2$, ..., $704_N$ is closed and electrically connects the window width generators $214_1$, $214_2$, ..., $214_N$ and the reference signal generators $212_1$, $212_2$, ..., $212_N$. The third set of switches $708_1$, $708_2$, ..., $708_N$ is closed and electrically connects the output of the comparators $202_{11}$, $202_{21}$, ..., $202_{N1}$ and the sub-logic $706_1$, $706_2$, ..., $706_N$. In this configuration, the logic 700 outputs a pulse only when a pulse has a height, which is not larger than the value of the reference signal generators $212_1$, $212_2$, ..., $212_N$ plus the value of the window width generators $214_1$, $214_2$, ..., $214_N$ and larger than the value of the reference signal generators $212_1$, $212_2$, ..., $212_N$, in other words a height, which is between both these two levels.

For non-calibration (or normal) operation, the first set of switches $702_1$, $702_2$, ..., $702_N$ is open and electrically disconnects the output of the shaper 116 with the comparators $202_{11}$ and $202_{21}$, ..., $202_{N1}$. The second set of switches $704_1$, $704_2$, ..., $704_N$ is open and electrically disconnects the window width generators $214_1$, $214_2$, ..., $214_N$ and the reference signal generators $212_1$, $212_2$, ..., $212_N$. The third set of switches $708_1$, $708_2$, ..., $708_N$ is open and electrically disconnects the output of the comparators $202_{11}$, $202_{21}$, ..., $202_{N1}$ and the sub-logic $706_1$, $706_2$, ..., $706_N$. In this configuration, the first set of comparators $202_{11}$ and $202_{21}$, ..., $202_{N1}$ is disabled, and the logic 700 outputs the outputs of the comparators $202_{12}$ and $202_{22}$, ..., $202_{N2}$.

In order to get comparable spectra for all N channels, the window widths provided by the N window width generators 124 are similar to each other. This may be achieved once by characterizing the window width as a function of the DAC values controlling the window width and storing those DAC values which lead to very similar window-widths values. In order get sufficiently similar window widths, the DAC is implemented with a larger number of bits (e.g. 6 bit), so that the least significant bit (LSB) corresponds to, e.g., 1/64 of the intended window width (a 0 width can be excluded).

The window-based spectrum measurement may be taken during an air scan, with the purpose of determining the detector response for each pixel at a given X-ray energy. For this, a plurality of K-edge filters (e.g. Pb for 89 keV, Gd for 60 keV) can be used. The frequency the measurement is taken depends, e.g., on the stability of the detector response. In addition, the spectrum measurement can also be used to do tube and detector characterization during a regular maintenance session. In this instance, K-edge filters are not used. Radio-active sources that irradiate at a fixed energy may or may not be used.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A detector array signal processor of an imaging system, comprising:
   a processing circuitry; and
   a memory containing instructions that, when executed by the processing circuitry, configure the detector array signal processor to:
   receive, sequentially, a plurality of pulses, each pulse having a peak height indicative of an energy of different detected radiation;
   receive a window width for a window based spectrum measurement;
   receive a set of reference signals for a first comparator;
   provide the pulse and, sequentially, each of the reference signals of the set to the first comparator;
   provide the pulse and, sequentially, each of the reference signals added to the window width to a second comparator;
   count a first number of times a first output of the first comparator exceeds the reference signals;
   count a second number of times a second output of the second comparator exceeds the reference signals added to the window width; and
   determine a window based spectrum measurement for each of the different reference signals by determining a difference between the first number and the second number for the corresponding reference signals.

2. The detector array signal processor of claim 1, further comprising:
   a shaper that is configured to process a signal produced by a direct conversion detector pixel in response to detecting radiation emitted by the imaging system and to generate the pulse.

3. The detector array signal processor of claim 2, further comprising:
   a pre-processor that is configured to amplify the signal produced by the direct conversion detector pixel, wherein the shaper is configured to process the amplified signal.

4. The detector array signal processor of claim 1, wherein, in response to the detector array signal processor not being in a window based spectrum measurement mode, the processing circuitry is configured to supply a third reference signal to the first comparator, which is configured to generate a third output, and the processing circuitry is configured to generate a fourth different reference signal and to supply the fourth different reference signal to the second comparator, which is configured to generate a fourth output, and the processing circuitry is configured to count a number of times peak heights of a plurality of different input pulses exceed the third reference signal and a number of times the peak heights of the plurality of different input pulses exceed the fourth reference signal.

5. The detector array signal processor of claim 4, further comprising:
a binner that is configured to bin the counts for the third reference signal and the counts for the fourth reference signal into corresponding energy ranges.

6. The detector array signal processor of claim 5, further comprising:
a decomposer that is configured to decompose the binned counts into different energy components, using the window based spectrum measurements.

7. The detector array signal processor of claim 6, wherein the different energy components include a first energy component corresponding to a first energy and a second energy component corresponding to a second energy, wherein the first energy is greater than the second energy.

8. The detector array signal processor of claim 7, further comprising:
a reconstructor that is configured to reconstruct the first energy component and generate a first image corresponding to the first energy component, and that is configured to reconstruct the second energy component and generate a second image corresponding to the second energy component.

9. The detector array signal processor of claim 1, wherein the processing circuitry is configured to maintain the set of reference signals and change a value of the window width.

10. The detector array signal processor of claim 1, wherein the processing circuitry is configured to calibrate an energy threshold of the first comparator based on the window based spectrum measurements.

11. A method, comprising:
receiving, sequentially, a plurality of pulses, each having a peak height indicative of an energy of different detected radiation;
receiving an energy window width for an energy window based spectrum measurement;
receiving a set of reference signals for a first comparator;
providing the pulse and, sequentially, each of the reference signals of the set to the first comparator;
providing the pulse and, sequentially, each of the reference signals added to the energy window width to a second comparator;
counting a first number of times a first output of the first comparator exceeds the reference signals;
counting a second number of times a second output of the second comparator exceeds the reference signals added to the energy window width; and
determining an energy window based spectrum measurement for each of the different reference signals by determining a difference between the first number and the second number for the corresponding reference signals.

12. The method of claim 11, further comprising:
employing the energy window based spectrum measurements in a decomposition of photon-counting data that uses an estimate of a response of a photon counting detector.

13. The method of any of claim 11, wherein the set of reference signals correspond to kV values and increase in increments on the order of tenths of kVs.

14. The method of claim 12, further comprising:
changing a value of the energy window width based on a step, where the step corresponds to a predetermined kV value and increase in increments on the order of tenths of kVs.

15. The method of claim 12, further comprising:
determining energy window based spectrum measurements for all of the comparators.

16. The method of claim 15, further comprising:
calibrating an energy threshold of a comparator with the corresponding energy window based spectrum measurement.

* * * * *